United States Patent [19]

Margolin

[11] 4,195,293

[45] Mar. 25, 1980

[54] RANDOM DOT GENERATOR FOR RASTER SCAN VIDEO DISPLAYS

[76] Inventor: Jed Margolin, 555 W. Middlefield Rd, #B201, Mountain View, Calif. 94043

[21] Appl. No.: 906,966

[22] Filed: May 18, 1978

[51] Int. Cl.[2] .......... G06K 15/20

[52] U.S. Cl. .......... 340/732; 328/187; 340/734; 340/744; 358/183

[58] Field of Search .......... 340/732, 734, 744; 358/182, 183; 328/187

[56] References Cited

U.S. PATENT DOCUMENTS 3,793,483 2/1974 Bushnell .......... 340/732

*Primary Examiner*—David L. Trafton

*Attorney, Agent, or Firm*—Lowhurst & Aine

[57] ABSTRACT

A Linear-Feeback-Shift-Register produces a pseudo-random sequence of bits that are used to produce a stationary random pattern of dots on a standard raster scan video display. The density of dots is adjustable as is their intensity. This dot pattern may be combined with other video sources and thus may serve as a back-ground for the playing of TV video games, especially those of the "space war" variety. The dot pattern may also be moved as a whole under player control and thus form the basis for a novel type of video game to be described.

11 Claims, 7 Drawing Figures

RANDOM DOT GENERATOR FOR RASTER SCAN VIDEO DISPLAYS

BACKGROUND OF THE INVENTION

This invention pertains generally to the display of video images and particularly to a system of generating a large number of randomly placed dots on a video display of the raster scan type.

Linear-Feedback-Shift-Registers (LFSR's) have been used to produce pseudorandom sequences of binary signals whose uses include the generation of noise signals, use as test signals for transmission paths (U.S. Pat. No. 3,986,168 Anderson), and as code sequences for encoding information (U.S. Pat. No. 3,515,805 Fracassi and Savage). Images for raster scan video displays have been produced through the use of analog delays (U.S. Pat. No. 3,659,284 Rausch), by digital addressing means (U.S. Pat. No. 3,793,483 Bushnell, and pending application Ser. No. 859,937 by present applicant), and through the memory scanning technique of representing each picture element on the screen by a different bit of memory (U.S. Pat. No. 4,026,555 Kirschner et al).

The cost of dot displays using analog delays or digital addressing increases with the number of dots. The cost of a display using the memory scanning technique increases rapidly with screen resolution.

SUMMARY AND OBJECTS OF THE INVENTION

A shift register with linear feedback generates a pseudorandom sequence of bits. Presetting the shift register to the same non-zero state causes it to generate the same pseudorandom sequence. By thus presetting the shift register during each field of a raster scan display at the same position of the raster, a stationary random pattern will be generated. In order to simulate a "star field" in space the density of ONE's is reduced while preserving their random quality and a one-shot is used to reduce all "lines" (where the reduced density sequence consists of consecutive ONE's) to dot length. The length of the dot can be made to determine its intensity. This allows digital gating to be used with other video sources although standard analog techniques may also be used. Changing the position (i.e. timing) on the raster where the LFSR Preset pulse occurs causes the random pattern of dots to move as a whole, and thus forms the basis for a novel type of video game to be described.

It is, therefore, an object of the present invention to provide a random dot generator for raster scan video displays.

Another object of the invention is to provide a random dot generator with selectable dot pattern densities.

A further object of the invention is to provide a random dot generator whose dots are of adjustable width in order to thereby determine their intensity when gated with other video sources.

Other objects and features of the invention will be more readily evident from the following detailed description of the preferred embodiments.

DESCRIPTION OF THE PREFERRED EMBODIMENTS

Figure 1:
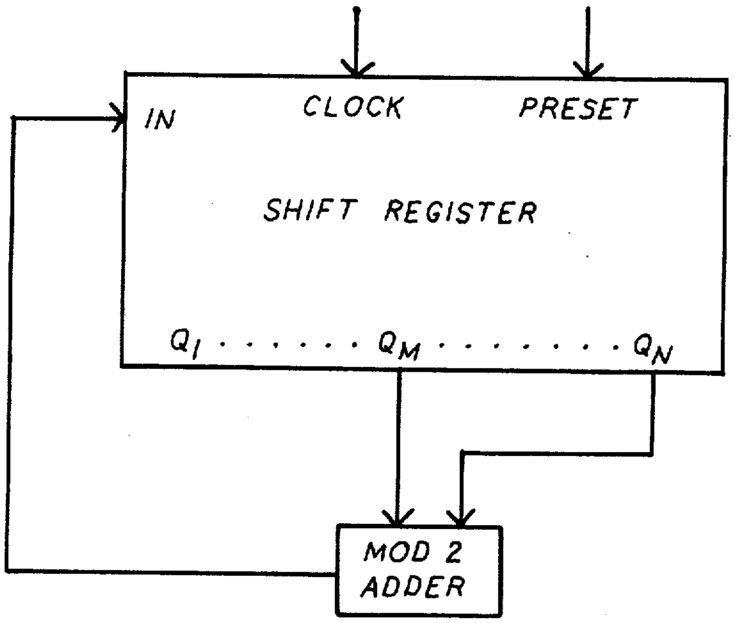
FIG. 1 is a block diagram showing the general form of a Linear-Feedback-Shift-Register with two feedback taps.
Figure 2:
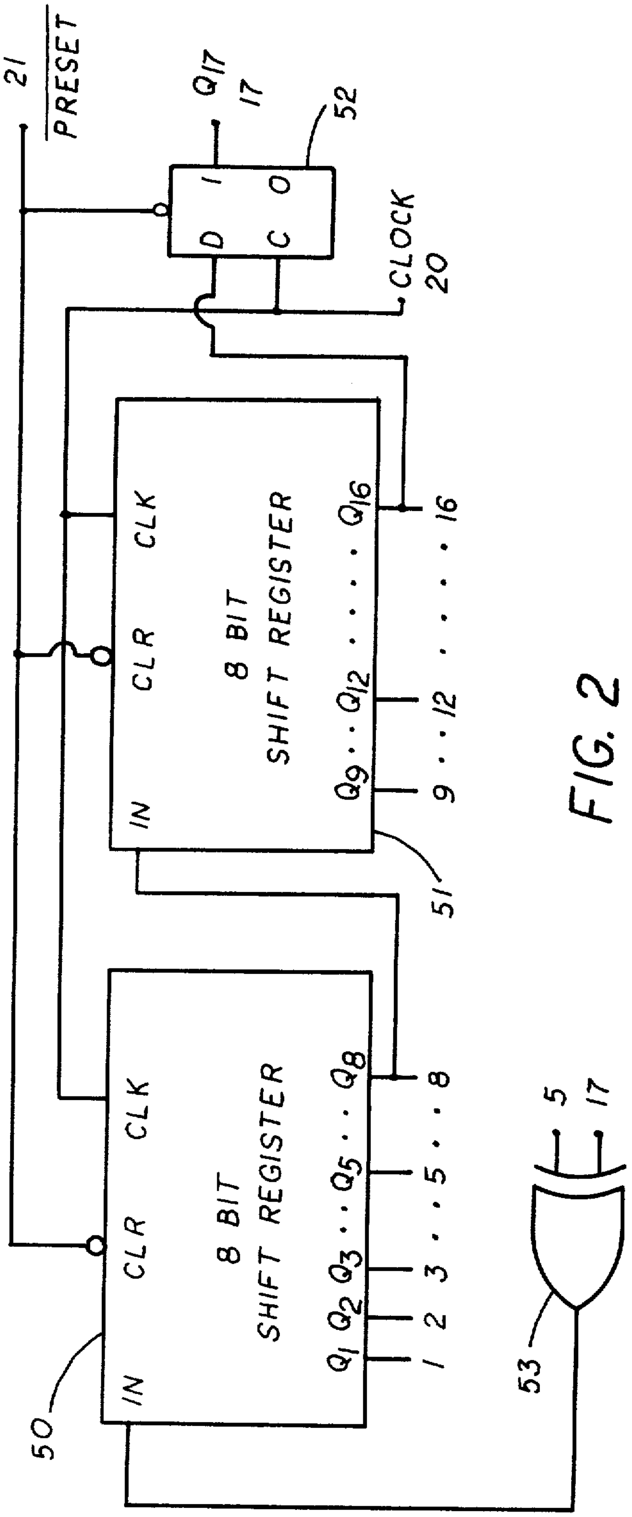
FIG. 2 is a schematic of a 17-stage Linear-Feedback-Shift-Register using commonly available TTL packages.

The theory of Linear-Feedback-Shift-Registers (LFSR's) is covered extensively in "Shift Register Sequences" by S. Golomb (Holden-Day Inc., San Francisco 1967). Of particular interest is the fact that there are shift register lengths for which a feedback network using only two taps will cause the shift register (of length N) to cycle in a pseudorandom manner through $2^N$-1 different states before repeating any. All states are generated except for the word containing all ZEROS. A list of several such registers derived from the Golomb book can be found in *Electronics* magazine, May 27, 1976, on page 107. (Feedback networks with more than two taps are also feasible but require more circuitry.) FIG. 1 shows the basic form of an N stage LFSR using a two-input Modulo 2 adder as the feedback network. The feedback taps are the Nth stage and an intermediate Mth stage, selected so as to provide a pseudorandom sequence of maximal length ($2^N$-1 states). FIG. 2 shows a specific implementation of a 17 stage LFSR using commonly available TTL packages. This implementation provides an easy way to preset the shift register to a non-zero state. The reason for wanting to do this will presently become evident.

The output (17) of the LFSR can be connected to the video input of a TV modulator to produce an RF signal for attachment to the TV antenna terminals of a commercial TV receiver or it can be used to produce composite video. The Video Sync Generator, Combiner, and Modulator (59) represents such a device, the details of which are known to those skilled in the art. With a suitable LFSR clock, the video noise produced on the display will be similar to that observed on a vacant TV channel.

Figure 3:
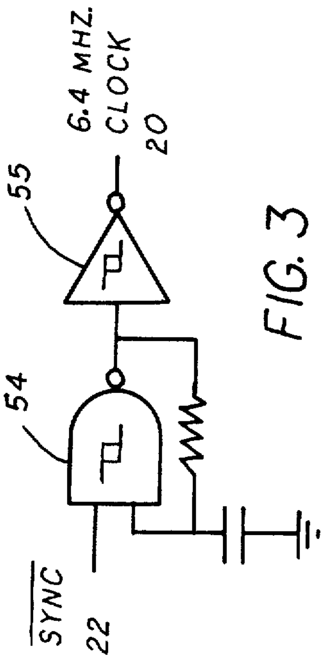
FIG. 3 is a schematic of an RC oscillator which may be synchronized to the Horizontal scanning rate.

One of the properties of a LFSR is that, starting from the same non-zero state, it will always produce the same pseudorandom sequence. Therefore by presetting the LFSR to the same non-zero state during each field at the same position of the raster, a stationary random pattern is generated on the display screen. Where NTSC TV signals are generated, Flip-Flop (60) is used to produce a Preset pulse at the beginning of the first complete horizontal line in each field. (In an NTSC interlaced display the even field starts at the beginning of a horizontal line while the odd field starts in the middle of one.) To make it completely stable the LRSR Clock (20) must be synchronized to TV sync. In cases where the TV sync and the LFSR Clock are derived from the same oscillator this will in general already be the case. Where a separate clock is required, the circuit in FIG. 3 can be used. The Sync input (22) when connected as shown causes the oscillator to stop during Horizontal Drive such that at the end of each pulse the oscillator always begins oscillating from the same electrical state. This eliminates the one bit bobble that would otherwise occur. The frequency of the Clock (20) depends on the resolution desired and determines the required shift register length.

For example, a video display of 320H * 240V provides a coordinate grid of 76,800 points using a bit oscillator of 6.4 MHz. If the LFSR uses a clock of that frequency it must produce a sequence at least that long. The size that meets this requirement is 17 stages; it produces a sequence length of 131,071 bits. The feedback taps can be placed at stages 3,17; 5,17; or 6,17.

When any single stage such as (17) is used as the input to the Sync Gen, Combiner, and Modulator (59) whose output (26) or (27) is used to drive an appropriate video display, the screen will show a random pattern of different line lengths with a density of 50%. (Statistically, half of the screen will be white.) To more realistically simulate a field of stars in space this number must be reduced while preserving the randomness. This is done through the use of AND gate (56) whose inputs are connected to the desired number of different LFSR stages and whose output drives a One-Shot (57). The output of the One-Shot produces the Dot Video (24'). Although the AND gate is shown as having six inputs in this embodiment it is clearly not restricted to that number. Each additional input reduces the number of dots to approximately one-half its previous value. Each gate input removed increases the number of dots by a factor of approximately two. Although it doesn't matter which LFSR stages are used, by using the last six it can be interpreted in the following way: in comparing it to the use of the last stage only, as an output, this arrangement delivers a one-shot pulse only for lines six or more units long.

Figure 5:
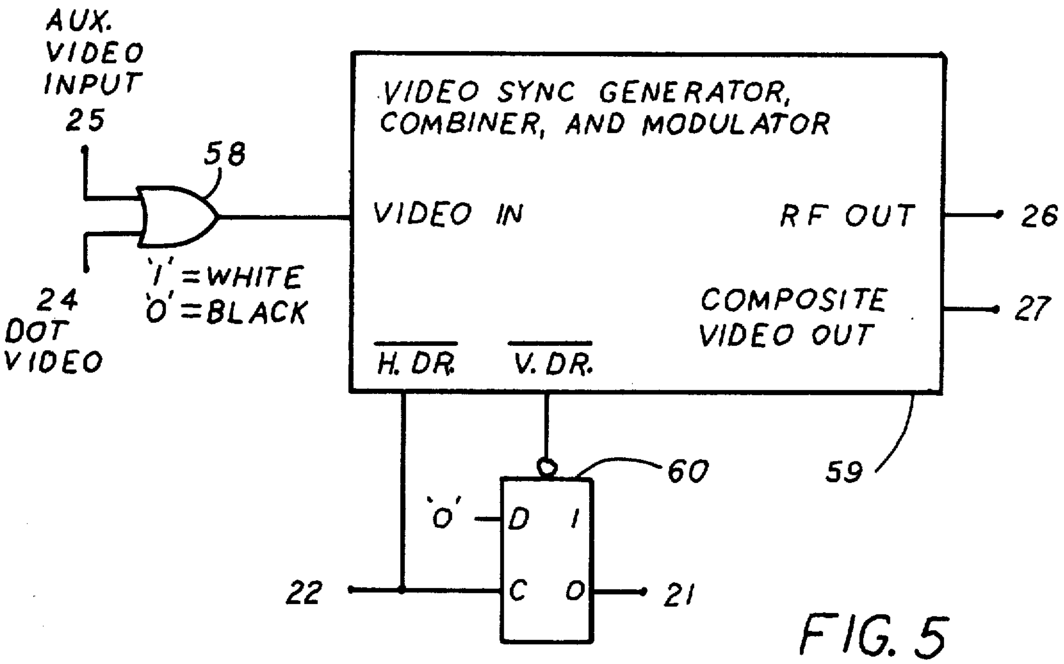
FIG. 5 is a block diagram of a standard Video Sync Generator, Combiner, and Modulator, showing how the output of the present invention may be digitally gated with another video source.

In a high resolution display the duration of the One-Shot (57) will control the width of the dot and thus its intensity. (At least within limits; an extremely wide "dot" really isn't much of a dot.) In systems with relatively low bandwidth such as commercial TV receivers the duration of the One-Shot will still determine the dot intensity. The bandwidth limitation means that there is a minimum length line that can be displayed on the screen. As the pulse width of the One-Shot is made to correspond to a line shorter than this, the line length will not be made shorter but will instead become less intense. This works as long as the repetition rate of the pulses is within the display's bandwidth. This allows normal digital gating to be used in adding the random dot pattern to an existing digital video source. In FIG. 5 the screen background is black and the dots are white, as are the objects from the auxiliary video input (25). Other configurations may also be used. The dot pattern may also be used with a color display system.

Figure 6:
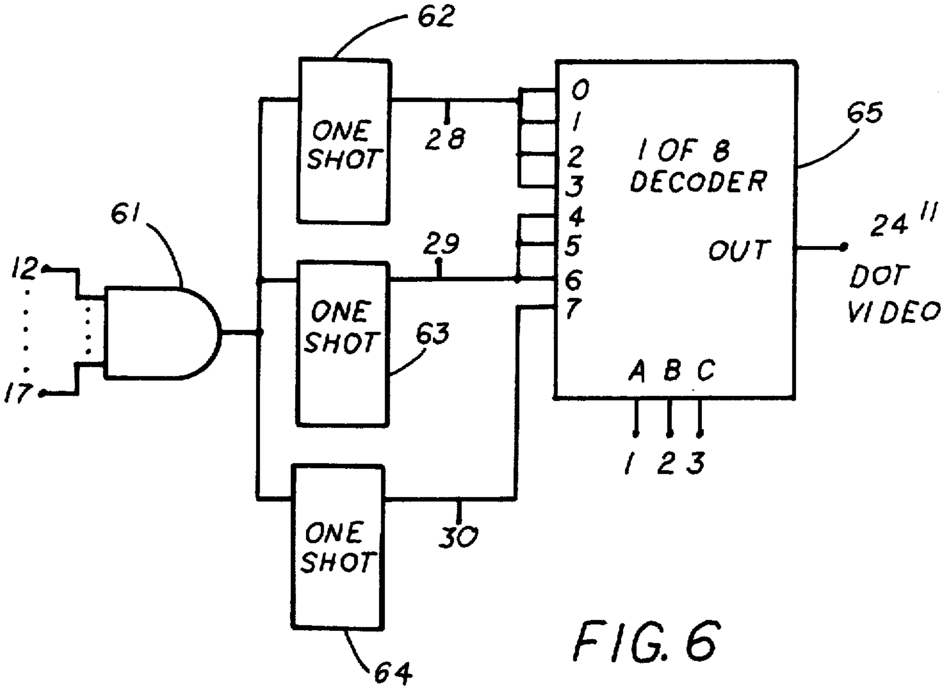
FIG. 6 is a schematic of an arrangement of logic circuits used to randomly select the dot intensity.

An improvement in the simulation of a star field can be made by having the dots be of different intensities. FIG. 6 shows how this may be accomplished. In this embodiment, AND gate (61) drives One-Shots (62), (63), and (64), each one having a different pulse width. One-Shot (62) produces a dot of low intensity, One-Shot (63) produces a dot of medium intensity, and One-Shot (64) produces a dot of high intensity. The 1-of-8 Decoder (65) receives its control input from LFSR stages not used for the AND gate. Thus the input to the Decoder will be randomly selected. Using several inputs for a particular One-Shot increases the probability that that One-Shot will be selected. In this embodiment the largest number of dots will be of low intensity, there will be a smaller distribution of dots of intermediate intensity, and a still smaller distribution of dots having a high intensity. Although this embodiment shows the selection of three intensities the method is clearly not limited to that number.

Figure 7:
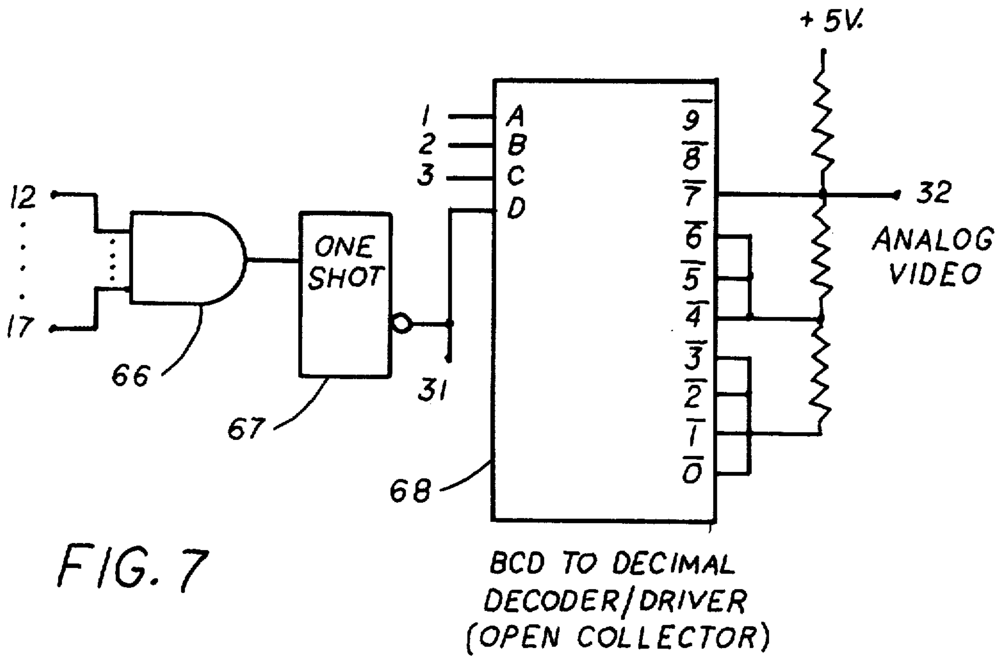
FIG. 7 is a schematic of another arrangement of logic circuits used to randomly select the dot intensity.

FIG. 7 shows how this same result may be produced for a analog video device. Because only the first seven of the ten outputs of the BCD-to-Decimal Decoder/-Driver (68) are used, the D input (31) functions as a strobe. One-Shot (67) provides a pulse corresponding to the highest intensity dot to be produced. The other Decoder inputs are connected to LFSR stages not used for AND gate (66). The Decoder (68) employs open-collector outputs which may therefore be wire-or'ed together as shown. The Video Output (32) is in analog form with 0 V. representing white and 5 v. representing black; intermediate voltage levels will produce intermediate levels of brightness. In this embodiment the largest number of dots will be of low intensity, there will be a smaller distribution of dots of intermediate intensity, and a still smaller distribution of high intensity dots. Although this embodiment shows the production of dots of three intensities the method is clearly not limited to that number.

Figure 4:
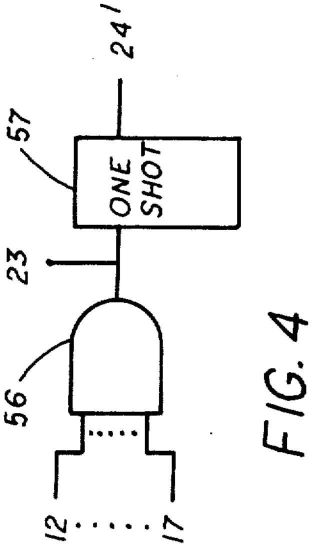
FIG. 4 is a schematic of an arrangement of logic circuits used to reduce the density of ONES produced by the Linear-Feedback-Shift-Register of FIG. 2.

In FIGS. 4, 6, and 7; AND gates (56), (61), and (66) are shown as having a fixed number of inputs. The number of inputs may instead be selected by manual or digital means known to those skilled in the art. In addition, as the number of inputs is increased the latitude in choosing the clock frequency increases.

Although the preceding discussion assumes that the LFSR is preset to the beginning of the first complete horizontal line, any pulse that always occurs at the same position of the raster can also be used. This pulse may be produced by analog delays, digital delays, or other digital addressing means. Descriptions of these means can be found in U.S. Pat. Nos. 3,778,058 (Rausch) and 3,793,483 (Bushnell) and in pending application Ser. No. 859,937 (by present applicant). As this pulse is moved to different points of the raster the dot pattern will move as a whole. In addition, in the case of an appropriately synchronized digital addressing scheme, the motion of the dot pattern can be made to be continuous as it wraps around the display screen horizontally and/or vertically. As the Preset pulse moves off toward the right side of the screen, the X Address is set to '0' and the Y Address is incremented. As it moves off toward the left side of the screen, the X Address is preset to its maximum number (the number of LFSR clock pulses delivered during a TV line) and the Y Address is decremented. As the Preset pulse moves off toward the bottom of the screen the Y Address is reset. It will also be necessary to modify the X Address to keep the dot pattern in line. As the Preset pulse moves off toward the top of the screen the opposite is done.

When operated in this manner it allows the construction of TV video games of the type of which the following is one example:

This is a space war game to be played between a computer and a human opponant. The random dot pattern on the video display represents a field of stars in space. The human has command of a "space defense station". Although it is fixed in space its weapons system can be positioned so as to be able to continuously scan all of space around it. The view on the video display represents the station's "weapons display" as it is directed to view the surrounding space. As "invaders" simulated by computer attack the station it must defend itself and destroy or disable the invaders if possible before running out of energy and being destroyed itself. The invading ships and the firing of weapons may be displayed by graphics methods already known.

Words describing the logic functions performed by the circuit elements should be given their broadest generic meaning. Various different implementations of the present invention can easily be discerned by those skilled in the art. Those variations are intended to be covered by the following claims.

I claim:

1. A random dot generator for raster scan video displays comprising:

clock means for providing clock pulses at a selected rate in synchronism with the scanning rate of the video display;

a linear-feedback-shift-register having a plurality of stages including an output stage, said register being responsive to said clock pulses and operative to provide a maximal length pseudorandom binery bit sequence from said output stage;

preset means for presetting said register to the same non-zero state after the completion of each field of video display; and means for applying said bit sequence to the normal video input terminal of a video display.

2. A random dot generator in accordance with claim 1 further comprising density means responsive to said bit sequence and operative to reduce the number of bits of a selected state in said bit sequence by a selected amount to form a density controlled bit sequence.

3. A random dot generator in accordance with claim 2 in which said density means is also responsive to the state of a first set of selected stages of said register and operative to pseudorandomly provide bits of the selected state in said density controlled bit sequence only upon the occurrence of a selected combination of the states of said selected stages.

4. A random dot generator in accordance with claim 2 in which said density means includes an AND gate and monostable multivibrator means, said gate having its input terminals coupled to said output stage and a first set of selected stages of said register and said monostable multivibrator means being responsive to the output signal of said gate and operative to provide said density controlled bit sequence.

5. A random dot generator in accordance with claim 1 further comprising brightness means responsive to said bit sequence and operative to selectively change the width of selected bits of said selected state in the bit sequence to thereby change the brightness of the resulting video display.

6. A random dot generator in accordance with claim 2 further comprising brightness means responsive to said density controlled bit sequence and operative to selectively change the width of selected bits of said selected state in the brightness of the resulting video display.

7. A random dot generator in accordance with claim 6 in which said brightness means includes a plurality of monostable multivibrator means each of which provides an output pulse of a preselected width, and a selection network responsive to a second set of selected stages of said register and operative to pseudorandomly select the output of different monostable multivibrator means to produce a density and brightness controlled bit sequence.

8. A random dot generator in accordance with claim 7 in which said selection network includes a decoder responsive to the state of said second set of stages and operative to select the output pulse of one of said monostable multivibrator means for inclusion into said density and brightness controlled bit stream.

9. A random dot generator in accordance with claim 1 in which the rate of clock pulses is selected to be equal to the number of bit possibilities desired for each horizontal line of the video display.

10. A random dot generator in accordance with claim 2 further comprising brightness means responsive to said density controlled bit sequence and operative to selectively to change the amplitude of selected bits of said selected state in the bit sequence to thereby change the brightness of the resulting video display.

11. A random dot generator in accordance with claim 10 in which said brightness means includes an amplitude selector response to said second set of stages of said register and operative to pseudorandomly provide changes in the amplitude of the various bits in the density controlled bits sequence.

* * * * *